May 22, 1962  D. D. KINSWORTHY  3,035,761
BLOWERS
Filed Feb. 24, 1959  2 Sheets-Sheet 1
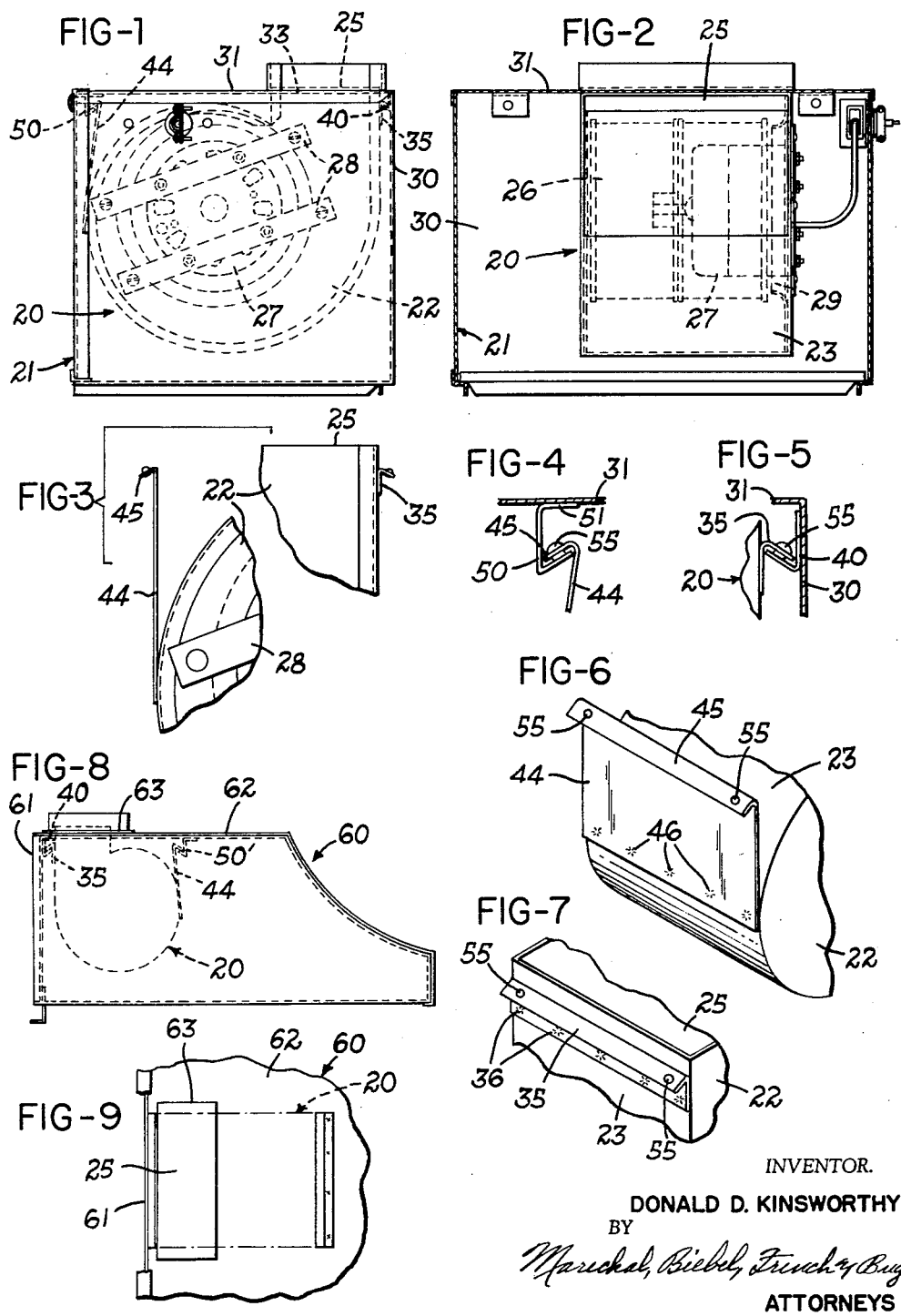
INVENTOR.
DONALD D. KINSWORTHY
BY
Marechal, Biebel, French y Bugg
ATTORNEYS May 22, 1962 D. D. KINSWORTHY 3,035,761
BLOWERS
Filed Feb. 24, 1959 2 Sheets-Sheet 2
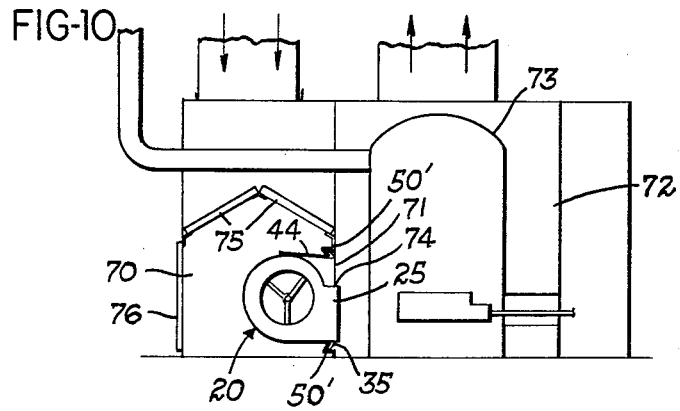
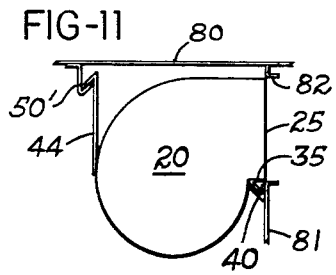
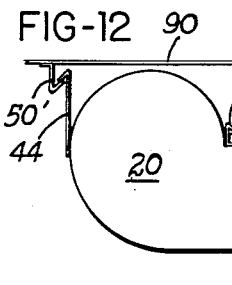
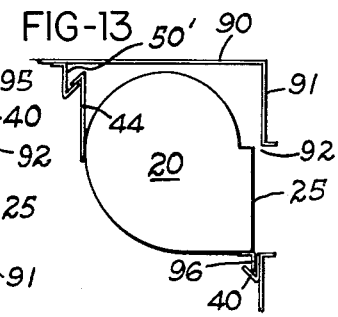
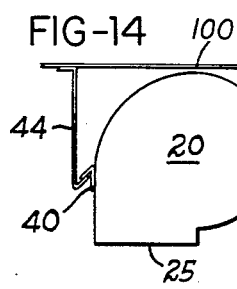
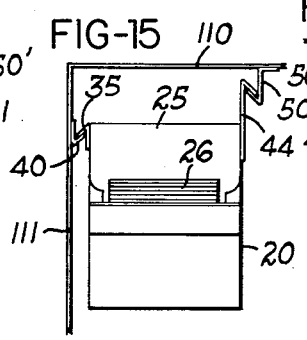
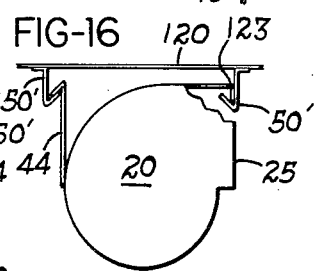
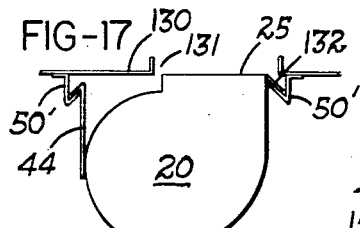
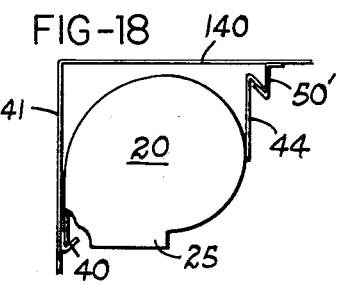
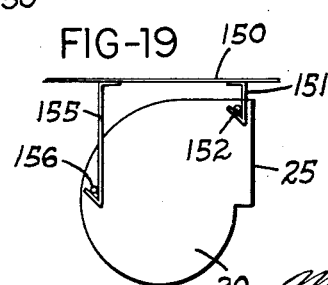
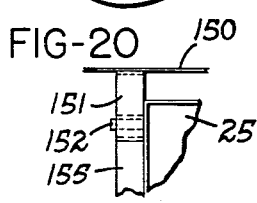
INVENTOR.
DONALD D. KINSWORTHY
BY
Marechal, Biebel, French & Bugg
ATTORNEYS United States Patent Office 3,035,761
Patented May 22, 1962

3,035,761
BLOWERS
Donald D. Kinsworthy, Dayton, Ohio, assignor to The Lau Blower Company, Dayton, Ohio, a corporation of Ohio
Filed Feb. 24, 1959, Ser. No. 795,276
2 Claims. (Cl. 230—235)

This invention relates to centrifugal blowers, and it has special relation to the mounting of centrifugal blower assemblies in operative position in conjunction with furnaces, air conditioners, ventilators and like installations.

It is a primary object of the invention to provide novel and improved mountings for centrifugal blower assemblies which are of outstanding simplicity from the standpoint both of initial installation and also of the mounting and removal of the blower assembly for servicing, and which in addition are readily adapted to a wide variety of installations and blower positions therein.

It is particularly an object of the invention to provide an improved mounting for a blower assembly which is effectively snap-acting in response to bodily movement of the blower assembly into proper position and wherein also the weight of the blower assembly is a factor in maintaining it properly in position.

Additional objects and advantages of the invention will be apparent from the following description, the accompanying drawings, and the appended claims.

In the drawings—

FIG. 1 is a view in side elevation illustrating a blower installation in accordance with the invention;

FIG. 2 is a view looking from left to right in FIG. 1 with parts of the surrounding enclosure broken away in section;

FIG. 3 is an enlarged fragmentary view illustrating the mounting of the blower assembly in FIG. 1;

FIG. 4 is a further enlarged fragmentary view showing one of the mounting bracket assemblies of FIG. 1;

FIG. 5 is a view similar to FIG. 4 showing the other mounting bracket assembly of FIG. 1;

FIGS. 6 and 7 are fragmentary perspective views further illustrating the mounting for the blower assembly in FIG. 1;

FIG. 8 is a side elevational view showing another blower installation in accordance with the invention, specifically in a ventilating hood for a kitchen range;

FIG. 9 is a fragmentary plan view of the hood of FIG. 8;

FIG. 10 is a diagrammatic view illustrating the application of the invention to the mounting of a blower assembly in a furnace;

FIGS. 11–19 are diagrammatic elevational views illustrating modifications of the invention; and FIG. 20 is a fragmentary view looking from right to left in FIG. 19.

Referring to the drawings, which illustrate preferred embodiments of the invention, FIGS. 1–7 show an installation in accordance with the invention of a blower assembly indicated generally at 20 in a kitchen ventilator casing indicated generally at 21. The blower assembly 20 is shown as including a blower housing comprising the usual scroll sides 22, scroll back 23, and outlet 25. A blower wheel 26 is mounted on the drive shaft of a motor 27 which is mounted on one side 22 of the housing by brackets 28 and projects into the interior of the housing through the inlet 29.

The present invention is concerned with the means for mounting the blower housing 20 within the casing 21, which includes a side wall 30 and an upper wall 31 having an opening 33 therethrough for receiving the blower outlet 25. Referring particularly to FIGS. 3–7, a mounting bracket 35 of generally inverted trough shape is secured as by welding at 36 to extend along the scroll back 23 of the blower housing adjacent the outlet 25. A complementary bracket 40 forms a keeper for the bracket 35 and is welded or otherwise secured to the side wall 30 of the casing 21 adjacent the opening 33. An additional bracket 44 of sheet metal includes a turned over flange 45 along one end and is secured along its other end as by welding at 46 on the opposite side of the scroll back 23 of the blower housing from the bracket 35. A complementary bracket or keeper 50 for the bracket 44 of similarly flanged construction is secured as by welding of its flange portion 51 to the top wall 31 of the casing 21.

With this construction as shown in FIGS. 1–7, mounting of the blower assembly in position is effected by simply hooking the bracket 35 over its keeper bracket 40 and then swinging the blower housing upwardly using this pair of interfitting brackets as a pivot. The bracket 44 is elongated in the vertical direction and is of sufficiently resilient sheet metal for ready deflection by engagement with the under surface of its cooperating bracket 50 until its flange portion 45 passes over and snaps back into hooked relation with the keeper bracket 50. This is all that is required to mount the assembly, since its weight will thereafter hold it in suspended position within the casing 21. Removal of the blower assembly for servicing or replacement is accomplished with equal ease, by simply pivoting it upwardly on the brackets 35 and 40, manually deflecting the bracket 44 inwardly sufficiently to clear the keeper bracket 50, lowering the blower until the bracket 44 is below the bracket 50, and then lifting the bracket 35 out of the bracket 40. It is desirable as shown in FIGS. 3–7, to provide the brackets 35 and 44 with rubber grommets 55 for cushioning their mounting on the keeper brackets 40 and 50 and thereby reducing transmission and vibration to the casing 21.

FIGS. 8–19 illustrate a variety of other applications of the invention, and in order to simplify the description, the same reference characters are used in all of these views for the blower assembly 20 and the brackets 35, 40, 44 and 50 where these parts are individually of the same construction as described in connection with FIGS. 1–7. Thus FIGS. 8 and 9 illustrate the mounting of a blower assembly 20 by means of brackets 35 and 40 in a range ventilating hood 60 having a back wall 61 and a top wall 62 provided with an opening 63 for receiving the blower outlet 25. The mounting brackets 35 and 44 are secured to the blower housing in the same positions as in FIGS. 1–7, and the keeper bracket 40 is secured as by spot welding on the back wall 61 of the hood 60. The keeper bracket for the mounting bracket 44, which is similarly secured on the underside of the hood top wall 62, is shown as of essentially the same construction as the bracket 50 except that its mounting flange is turned in the opposite direction, and it is therefore identified as 51′. Mounting of the blower in position in this installation is accomplished in the same manner as described in connection with FIGS. 1–2 and provides similar advantages.

FIG. 10 shows an installation in accordance with the invention wherein the blower assembly 20 is mounted in the cold air chamber 70 of a furnace on the wall 71 between the cold air chamber 70 and the hot air chamber 72 surrounding the combustion chamber 73, and the blower assembly is arranged with its outlet projecting horizontally through an opening 74 in the wall 71. FIG. 10 also shows filters 75 of the usual type which are accessible for removal and replacement through the door 76.

In FIG. 10, the mounting bracket 35 is secured to the blower housing in the same position as in FIGS. 1–7, but its cooperating keeper bracket is mounted on the wall 71 below the opening 74 and is therefore shown as a keeper bracket 50'. Keeper bracket 50' for the mounting bracket 44 is mounted on the wall 71 above the opening 74, and the mounting of this blower assembly in position is carried out by first interfiitting the brackets 35 and 77, pivoting the blower housing thereon until the brackets 44 and 50' are in position for engagement, and then allowing the weight of the blower assembly to hold it in place. It will be apparent that in this type of mounting the grommets 55 operate in both directions to cushion the blower in position, since there will be a tendency for the bracket 35 to move toward the wall 71 under the weight of the mounted assembly.

FIGS. 11–19 show a variety of other arrangements in accordance with the invention. Thus in FIG. 11, the blower assembly 20 is mounted in an enclosure having a top wall 80 and a side wall 81 provided near the top wall 80 with an opening 82 for receiving the blower outlet 25 horizontally. The bracket 35 in this installation is mounted on the opposite side of the outlet 25 and in the reverse direction as compared with the bracket 35 in FIGS. 1–7, so that its flange portion extends forwardly toward the wall 82, but its keeper bracket 40 is mounted on the wall 81 similarly to the bracket 40 in FIG. 1.

The mounting bracket 44 in FIG. 11 is secured to the scroll back of the blower housing in a position opposite the outlet 25, but its complementary keeper bracket 50' is secured to the enclosure top wall 80 in the same manner as in FIG. 1. Installation of the blower assembly with this bracket arrangement is accomplished in essentially the same manner as already described in connection with FIGS. 1–2, and this installation therefore provides the same advantages as the forms of the invention already described.

FIG. 12 shows an installation similar to that of FIG. 11 in an enclosure having a top wall 90 and side wall 91, but the opening 92 in the wall 91 for the blower outlet 25 is spaced sufficiently below the top wall 90 to permit the blower assembly 20 to be mounted in the reverse direction from the arrangement in FIG. 11. The outlet end of the blower is mounted on the wall 91 by a mounting bracket 95 shown as identical with the keeper bracket 50 of FIGS. 1–7 and secured as by spot welding to the blower housing adjacent the outlet 25 for cooperation with a keeper bracket 40 secured to the wall 91. The arrangement of the mounting bracket 44 and its keeper bracket 50' is substantially the same as in FIG. 11, and the same mounting and removal procedure applies.

FIG. 13 shows a variation of the arrangement in FIG. 12 in which a mounting bracket 96 of right angled configuration is secured to the opposite side of the blower outlet from the bracket 95 in FIG. 12. The keeper bracket 40 for the bracket 96 is therefore mounted on the wall 91 below the opening 92, while the arrangement of the brackets 44 and 50' is the same as in FIG. 12.

FIG. 14 shows an arrangement in accordance with the invention for suspending a blower assembly 20 from a horizontal wall 100 with its outlet 25 pointing down. In this arrangement, the mounting bracket 44 is secured to the wall 100 and cooperates with a keeper bracket 40 secured to the scroll back of the blower housing. At the opposite side of the blower, there is secured a flexible mounting bracket 101 similar to the bracket 44 but somewhat shorter, and it cooperates with a keeper bracket 50' secured to the top wall 100. With this arrangement, either pair of brackets can be engaged first, with the blower assembly then being pivoted on the engaged pair of brackets until the other pair is similarly engaged.

FIG. 15 shows an arrangement for mounting a blower assembly 20 on an enclosure top wall 110 and side wall 111 in which the mounting brackets are located on the scroll sides of the blower so that its outlet 25 extends parallel with both of the walls 110 and 111. As shown, a bracket 35 is secured to one scroll side of the blower housing for cooperation with the keeper bracket 40 secured to the enclosure side wall 111. The elongated flexible mounting bracket 44 is secured to the opposite scroll side of the blower housing for cooperation with a keeper bracket 50' secured to the enclosure top wall 110.

FIG. 16 shows an installation similar to that in FIG. 11 for suspending a blower assembly 20 from an enclosure top wall 120. The arrangement of the mounting bracket 44 and its keeper bracket 50' is similar to FIG. 11, but the scroll back of the blower includes an integral flange portion 123 which acts as the other mounting bracket in cooperation with a second keeper bracket 50'. The manner of mounting this blower in position is the same as described in connection with FIG. 11.

FIG. 17 shows another arrangement wherein the blower housing includes an integral bracket portion, the installation being otherwise similar to that in FIG. 1 and including a top wall 130 having an opening 131 for the blower outlet 25. The arrangement of the mounting bracket 44 and its keeper bracket 50' is the same as in FIG. 11, but the mounting bracket at the outlet end of the blower housing comprises a flange 132 cooperating with a second keeper bracket 50' secured to the top wall 130.

FIG. 18 shows an arrangement for mounting a blower assembly 20 on an enclosure top wall 140 and side wall 141 with its outlet 25 directed downwardly along the wall 141. In this arrangement, the end of the scroll back at the outlet 25 forms the mounting bracket for cooperation with a keeper bracket 40 secured to the side wall 141. The mounting bracket 44 is secured to the opposite side of the scroll back for cooperation with a keeper bracket 50' secured to the top wall 140.

FIGS. 19 and 20 show still another arrangement in accordance with the invention in which a pair of mounting brackets is used on each side of the blower assembly 20 to suspend it from an enclosure top wall 150. The mounting bracket 151 is of essentially the same construction as the keeper bracket 50' but relatively short in width as shown in FIG. 20, and it cooperates with a keeper pin 152 projecting from the scroll side of the blower housing. The mounting bracket 155 is constructed similarly to the bracket 151 but substantially longer for greater flexibility, and it similarly depends from the wall 150 for cooperation with a keeper pin 156 projecting from the scroll side of the blower housing. In this installation, there will be a similar pair of brackets and keeper pins on the opposite side of the blower assembly, but otherwise the same general mounting procedure is used as with the other illustrated arrangements.

While the forms of apparatus herein described constitute preferred embodiments of the invention, it is to be understood that this invention is not limited to these precise forms of apparatus and that changes may be made therein without departing from the scope of the invention which is defined in the appended claims.

What is claimed is:

1. A blower installation of the character described comprising a blower assembly including a blower housing having a blower wheel therein, a structure for receiving said blower assembly in mounted relation, a first pair of mounting brackets for supporting one side of said blower housing, said brackets including flanges providing a trough-like contour in section and adapted for positive interfitting engagement providing for relative pivoting engagement thereof, means for securing said first pair of brackets selectively to said structure and said one side of said blower housing, a second pair of mounting brackets for supporting the opposite side of said blower housing, said second pair of brackets including extended flanges providing a trough-like contour in section and adapted for positive interfitting engagement, one of said second pair of brackets being of elongated resilient construction providing for flexure thereof in response to relative engagement of said flange thereon with said flange on the other of said second pair of brackets as said brackets move relatively past each other, and means securing said second pair of brackets selectively to said structure and to the opposite side of said housing from said first bracket to provide for positive interfitting engagement thereof in response to pivoting movement of said housing on said first pair of brackets to a position wherein said flanges on said second pair of brackets move relatively past each other followed by movement of said housing in the opposite direction.

2. A blower installation of the character described comprising a blower assembly including a blower housing having a blower wheel therein, a structure for receiving said blower assembly in mounted relation, a first pair of mounting brackets for supporting one side of said blower housing, said bracket including flanges providing a trough-like contour in section and adapted for positive interfitting engagement providing for relative engagement thereof, means for securing said first pair of brackets selectively to said structure and to said one side of said blower housing, an additional mounting bracket for supporting the opposite side of said blower housing including an elongated plate of resilient material having a flange extending along one edge thereof to form therewith a trough, a complementary bracket for said additional bracket including a similar flange adapted for positive interfitting engagement with said flange on said additional bracket, and means securing said additional and complementary brackets selectively to said structure and to the opposite side of said housing from said first pair of brackets with said flanges thereon facing in opposite directions and in such relative spacing that in response to pivoting movement of said housing on said first mounting bracket and said keeper means therefor, said oppositely facing flanges first engage each other to cause flexure of said plate until said flanges overlap for positive fitting engagement upon pivoting movement of said housing in the opposite direction.

References Cited in the file of this patent

UNITED STATES PATENTS

| | | |
|---|---|---|
| 2,011,421 | Searles | Aug. 13, 1935 |
| 2,331,958 | Breese | Oct. 19, 1943 |
| 2,464,473 | Wessel | Mar. 15, 1949 |
| 2,553,172 | Carrick | May 15, 1951 |
| 2,620,127 | Radcliffe | Dec. 2, 1952 |
| 2,697,163 | Spear | Dec. 14, 1954 |
| 2,755,015 | Deriglas | July 17, 1956 |
| 2,810,514 | Patrick | Oct. 22, 1957 |
| 2,862,657 | Copeland | Dec. 2, 1958 |